United States Patent
Jung et al.

(10) Patent No.: US 10,876,478 B2
(45) Date of Patent: Dec. 29, 2020

(54) FUEL INJECTION APPARATUS FOR GAS TURBINE

(71) Applicant: HANWHA AEROSPACE CO., LTD., Changwon-si (KR)

(72) Inventors: Seung Chai Jung, Changwon-si (KR); Hee Ho Park, Changwon-si (KR); Chul Ju Ahn, Changwon-si (KR)

(73) Assignee: HANWHA AEROSPACE CO., LTD., Changwon-si (KR)

(*) Notice: Subject to any disclaimer, the term of this patent is extended or adjusted under 35 U.S.C. 154(b) by 468 days.

(21) Appl. No.: 15/812,051

(22) Filed: Nov. 14, 2017

(65) Prior Publication Data

US 2018/0135521 A1 May 17, 2018

(30) Foreign Application Priority Data

Nov. 14, 2016 (KR) .................. 10-2016-0151312

(51) Int. Cl.
| | | |
|---|---|---|
| *F02C 7/22* | (2006.01) | |
| *F23R 3/14* | (2006.01) | |
| *F23D 11/10* | (2006.01) | |
| *F23R 3/04* | (2006.01) | |
| *F23R 3/28* | (2006.01) | |

(52) U.S. Cl.
CPC ............ *F02C 7/222* (2013.01); *F23D 11/103* (2013.01); *F23R 3/04* (2013.01); *F23R 3/14* (2013.01); *F23R 3/286* (2013.01)

(58) Field of Classification Search
CPC ...... F23R 3/04; F23R 3/14; F23R 3/28; F23R 3/286; F02C 7/222
See application file for complete search history.

(56) References Cited

U.S. PATENT DOCUMENTS

| | | | |
|---|---|---|---|
| 8,001,786 B2* | 8/2011 | Oda | F23R 3/28 |
| | | | 60/749 |
| 8,171,735 B2 | 5/2012 | Mancini et al. | |
| 9,109,553 B2* | 8/2015 | Matsuyama | F02M 23/12 |
| 9,404,422 B2 | 8/2016 | Zupanc et al. | |
| 9,423,137 B2 | 8/2016 | Nickolaus | |
| 10,352,570 B2* | 7/2019 | Venkatesan | F23R 3/28 |
| 2002/0162333 A1 | 11/2002 | Zelina | |
| 2011/0088401 A1 | 4/2011 | Mancini et al. | |

(Continued)

FOREIGN PATENT DOCUMENTS

| | | |
|---|---|---|
| JP | 2007-132548 A | 5/2007 |
| JP | 2012-127639 A | 7/2012 |
| JP | 2016-55274 A | 4/2016 |

*Primary Examiner* — Arun Goyal
(74) *Attorney, Agent, or Firm* — Sughrue Mion, PLLC

(57) ABSTRACT

A fuel injection apparatus for a gas turbine includes a fuel supply pipe; a first manifold connected to the fuel supply pipe and comprising a nozzle through which fuel is sprayed; a second manifold at least partially surrounding the first manifold at a predetermined interval apart from the first manifold in a radial direction, the second manifold including: an air inlet through which a first portion of air is introduced into the second manifold; and a fuel outlet where the fuel sprayed through the nozzle collides with the air thereby forming mixed fuel; and a first swirler provided at a predetermined interval apart from the second manifold in the radial direction, the first swirler configured to swirl the air toward the air inlet and the fuel outlet.

7 Claims, 2 Drawing Sheets

(56) References Cited

U.S. PATENT DOCUMENTS

2012/0144832 A1    6/2012  Herbon et al.
2015/0082797 A1*   3/2015  Matsuyama .............. F23R 3/14
                                                        60/746
2016/0265779 A1*   9/2016  Haynes .................. F23R 3/286

* cited by examiner

THE SECOND DIRECTION

THE FIRST DIRECTION

FUEL INJECTION APPARATUS FOR GAS TURBINE

CROSS-REFERENCE TO THE RELATED APPLICATION

This application claims priority from Korean Patent Application No. 10-2016-0151312, filed on Nov. 14, 2016, in the Korean Intellectual Property Office, the disclosure of which is incorporated herein by reference in its entirety.

BACKGROUND

1. Field

Apparatuses consistent with exemplary embodiments relate to a fuel injection apparatus for a gas turbine.

2. Description of the Related Art

A gas turbine is a combustion engine for operating a turbine by using a high-temperature/high-pressure combustion gas, and includes a compressor, a combustor, and a turbine. In the related art, the compressor compresses air and transmits the compressed air to the combustor, the combustor accelerates combustion of fuel, generates a high-temperature/high-pressure combustion gas and transmits the combustion gas to the turbine, and the turbine expands the high-temperature high-pressure combustion gas and generates power.

One of the various methods used by a combustor to improve combustion efficiency is a method of increasing a combustion surface area by atomizing fuel in a liquid state. For example, U.S. Patent Application Publication No. 2002-0162333 discloses a method of atomizing the fuel by spraying fuel from an external surface of a fuel nozzle body and spraying air in a direction perpendicular to a direction in which the fuel is sprayed. However, there is still a limitation in accelerating atomization of fuel through the described fuel-air collision.

SUMMARY

One or more exemplary embodiments include a fuel injection apparatus for a gas turbine which may accelerate atomization of fuel.

Additional aspects will be set forth in part in the description which follows and, in part, will be apparent from the description, or may be learned by practice of the presented exemplary embodiments.

According to an aspect of an exemplary embodiments, there is provided a fuel injection apparatus for a gas turbine including: a fuel supply pipe; a first manifold connected to the fuel supply pipe and including a nozzle through which fuel is sprayed; a second manifold surrounding the first manifold at a predetermined interval apart from the first manifold in a radial direction, and including an air inlet through which air is introduced and a fuel outlet where the fuel sprayed through the nozzle collides with the air; and a first swirler surrounding the second manifold at a predetermined interval apart from the second manifold in the radial direction and configured to cause the fuel to collide with the air.

The nozzle and the fuel outlet may overlap each other in the radial direction.

A direction in which the fuel is sprayed through the nozzle and a direction in which the air is sprayed through the fuel outlet may be parallel to each other.

A direction in which the fuel is sprayed by the first swirler may intersect a direction in which mixed fuel is sprayed by the second manifold.

Part of the air sprayed by the first swirler may branch and flow into the air inlet.

The fuel injection apparatus may further include a second swirler located in a space formed between the first manifold and the second manifold and configured to guide the air introduced into the air inlet to the fuel outlet.

According to an aspect of another exemplary embodiments, there is provided a fuel injection apparatus for a gas turbine, the fuel injection apparatus including: a fuel supply pipe; a first manifold connected to the fuel supply pipe and including a nozzle through which fuel is sprayed; a second manifold at least partially surrounding the first manifold at a predetermined interval apart from the first manifold in a radial direction, the second manifold including: an air inlet through which a first portion of air is introduced into the second manifold; and a fuel outlet where the fuel sprayed through the nozzle collides with the air thereby forming mixed fuel; and a first swirler provided at a predetermined interval apart from the second manifold in the radial direction, the first swirler configured to swirl the air toward the air inlet and the fuel outlet.

The nozzle and the fuel outlet may overlap each other in the radial direction.

A direction in which the fuel is sprayed through the nozzle and a direction in which the first portion of the air is sprayed through the fuel outlet from the air inlet may be parallel to each other.

A direction in which the air is sprayed by the first swirler may intersect a direction in which the mixed fuel is sprayed by the second manifold.

The first portion of the air sprayed by the first swirler branches from the air and flows into the air inlet.

The fuel injection apparatus may further include a second swirler provided between the first manifold and the second manifold in the radial direction, the second swirler configured to guide the air introduced into the air inlet to the fuel outlet.

A second portion of the air being swirled toward the fuel outlet may be configured to collide with the mixed fuel.

According to an aspect of another exemplary embodiments, there is provided a fuel injection apparatus for a gas turbine, the fuel injection apparatus including: a housing; a first swirler provided in the housing and configured to introduce air into the housing; a fuel supply pipe configured to supply fuel and provided on the housing; a first manifold extending from the fuel supply pipe and including a nozzle through which the fuel is sprayed; and a second manifold provided in the housing, the second manifold including: an air inlet through which a first portion of the air is introduced into the second manifold; and a fuel outlet where the fuel sprayed through the nozzle collides with the portion of the air thereby forming mixed fuel. At the air inlet, the air may be branched into the first portion of the air and a second portion of air configured to travel in a passage provided between the housing and the second manifold. The second portion of the air may be configured to collide with the mixed fuel.

A direction in which the second portion of the air is sprayed by the first swirler may intersect a direction in which the mixed fuel is sprayed by the fuel outlet.

The fuel injection apparatus may further include a second swirler provided between the first manifold and the second manifold in the radial direction, the second swirler configured to guide the first portion of the air introduced into the air inlet to the fuel outlet.

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to one of ordinary skill in the art. The terms have merely been used to explain exemplary embodiments and should not be construed as limiting the scope of the present disclosure. The singular forms "a", "an", and "the" are intended to include the plural forms as well, unless the context clearly indicates otherwise. The terms "comprises" and/or "comprising" used herein specify the presence of stated elements, steps, operations, and/or devices, but do not preclude the presence or addition of one or more other elements, steps, operations, and/or devices. It will be understood that, although the terms first, second, third etc. may be used herein to describe various elements, these elements should not be limited by these terms. These terms are only used to distinguish one element from another element.

Figure 1:
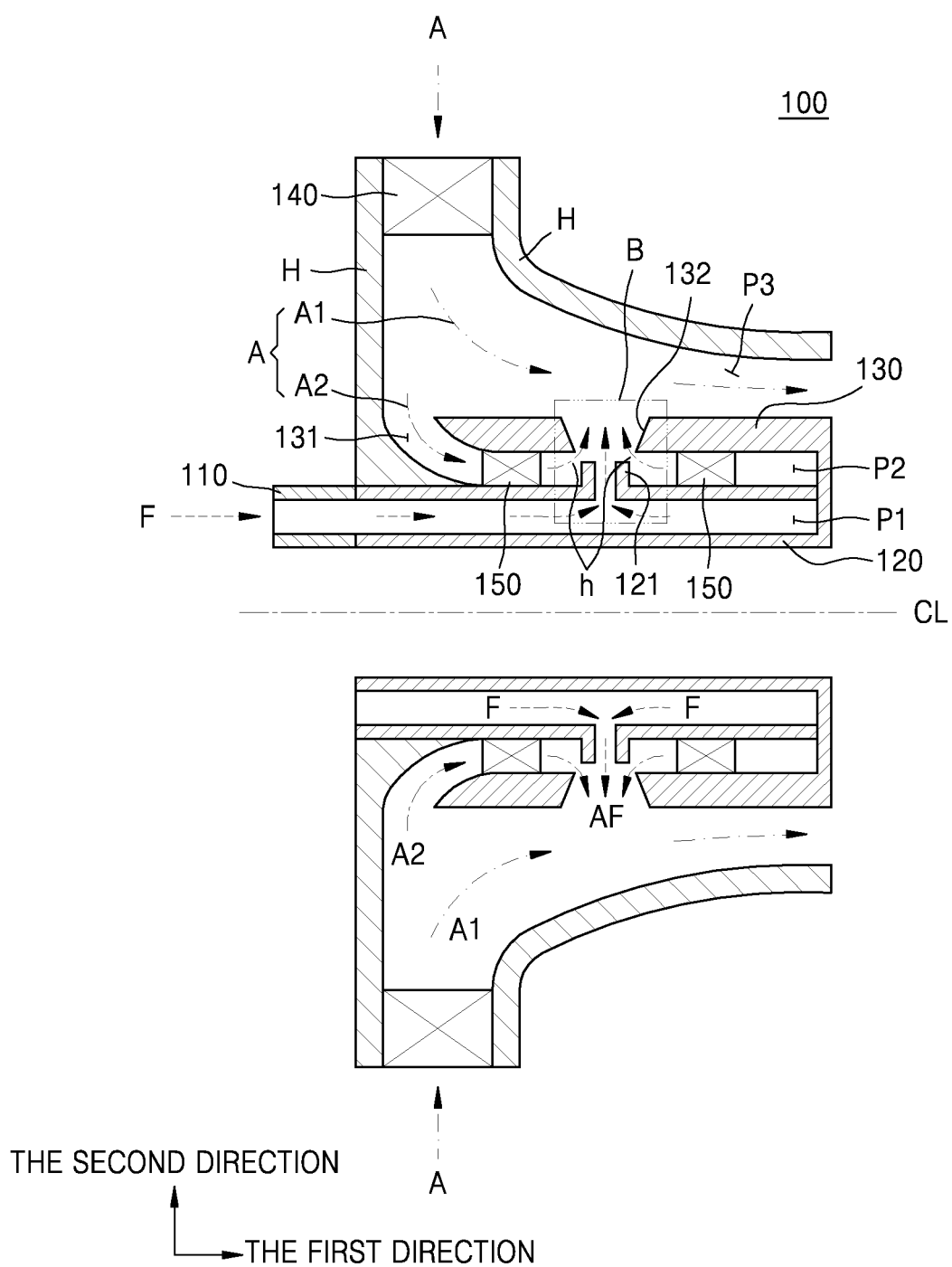
FIG. 1 is a conceptual view of a fuel injection apparatus for a gas turbine according to an exemplary embodiment.
Figure 2:
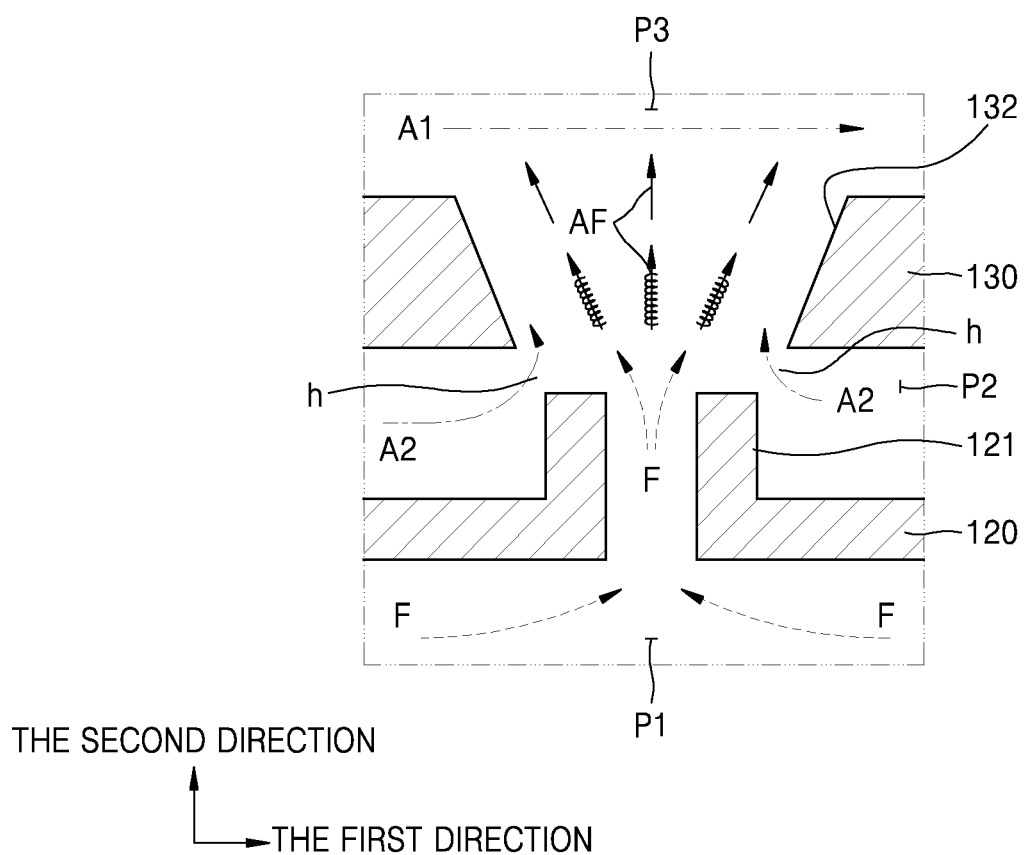
FIG. 2 is an enlarged cross-sectional view illustrating a portion B of FIG. 1 according to an exemplary embodiment.

FIG. 1 is a conceptual view of a fuel injection apparatus 100 for a gas turbine according to an exemplary embodiment. FIG. 2 is an enlarged cross-sectional view illustrating a portion B of FIG. 1 according to an exemplary embodiment.

Referring to FIG. 1, the fuel injection apparatus 100 may include a fuel supply pipe 110, a first manifold 120, a second manifold 130, a first swirler 140, and a second swirler 150.

The fuel supply pipe 110 passes through a housing H and supplies fuel F into the housing H. The fuel F introduced into the fuel supply pipe 110 may be guided to a first passage P1 formed in the first manifold 120.

The first manifold 120 may be connected to the fuel supply pipe 110 and may include a nozzle 121 through which the fuel F is sprayed. That is, the first manifold 120 may spray the fuel F introduced from the fuel supply pipe 110 through the nozzle 121.

The second manifold 130 may at least partially surround the first manifold 120 and may be spaced apart by a predetermined interval in a radial direction from the first manifold 120 in the radial direction along an axial direction of the fuel injection apparatus. The second manifold 130 may include an air inlet 131 through which air A is introduced, and a fuel outlet 132 where the fuel F sprayed through the nozzle 121 of the first manifold 120 collides with the air A to accelerate atomization of the fuel F.

The first swirler 140 may be spaced apart by a predetermined interval in the radial direction from the second manifold 130, and may cause the fuel F sprayed through the fuel outlet 132 to collide with the air A by swirling the air toward the air inlet 131 and the fuel outlet 132. The air A sprayed by the first swirler 140 may flow through an inner passage formed in the second manifold 130 and the housing H. In detail, a first part A1 of the air A sprayed by the first swirler 140 may flow through a third passage P3 formed between the housing H and the second manifold 130 in the radial direction, and a second part A2 of the air A may branch from the air A1, may be introduced into the air inlet 131, and may flow through a second passage P2 formed between the first manifold 120 and the second manifold 130 in the radial direction.

The second swirler 150 may be located in the second passage P2 formed between the first manifold 120 and the second manifold 130 in the radial direction, and may guide the air A2 introduced into the air inlet 131 to the fuel outlet 132.

In detail, the nozzle 121 of the first manifold 120 and the fuel outlet 132 of the second manifold 130 may overlap each other in the radial direction (e.g., a second direction). In addition, the nozzle 121 of the first manifold 120 and the air inlet 131 of the second manifold 130 may overlap each other in an axial direction (e.g., a first direction). In this structure, the fuel F sprayed through the nozzle 121 and the air A guided along an opening hole h formed between the first manifold 120 and the second manifold 130 and discharged to the fuel outlet 132 may be mixed with each other and sprayed in the radial direction (e.g., the second direction). Mixing of the fuel F with the air A will now be explained in detail with reference to FIG. 2.

Referring to FIG. 2, the fuel F introduced into the first passage P1 of the first manifold 120 through the fuel supply pipe 110 may flow in a direction parallel to a first direction. Although the fuel F flowing in the first passage P1 of the first manifold 120 may flow in a direction that is inclined by a predetermined angle with respect to the first direction, it is assumed for convenience of explanation that the fuel F flows in a direction parallel to the first direction.

The fuel F flowing in the first direction in the first passage P1 of the first manifold 120 may sharply turn near the nozzle 121 and may be sprayed through the nozzle 121 in a direction parallel to the second direction that intersects the first direction. Although the fuel F may be sprayed to the outside of the first manifold 120 through the nozzle 121 in a direction that is inclined by a predetermined angle from the second direction, it is assumed for convenience of explanation that the fuel F is sprayed in a direction parallel to the second direction.

The air A2 flowing in the first direction in the second passage P2 formed between the first manifold 120 and the second manifold 130 is discharged to the fuel outlet 132 through the opening hole h formed between the nozzle 121 and the second manifold 130. In this process, the fuel F sprayed through the nozzle 121 and the air A2 sprayed through the fuel outlet 132 may collide with each other, and thus atomization of the fuel F may be accelerated by the air A2. In this case, a direction in which the fuel F is sprayed through the nozzle 21 may be parallel to a direction in which the air A2 is sprayed through the fuel outlet 132.

As described above, fuel AF atomized by the air A2 may be sprayed through the fuel outlet 132 in the second direction. The atomized fuel AF sprayed through the fuel outlet 132 may collide with the air A1 flowing into and flowing in the third passage P3 formed between the housing H and the second manifold 130 through the first swirler 140. However, because a direction in which the air A1 flows through the third passage P3 is the first direction and a direction in which the atomized fuel AF is sprayed through the fuel outlet 132 is the second direction, directions in which the air A1 is sprayed and the atomized fuel AF is sprayed may intersect each other.

Accordingly, according to the fuel injection apparatus 100 according to an exemplary embodiment, the fuel F introduced into the fuel supply pipe 110 may collide with the air A twice and thus atomization of the fuel F may be accelerated. In detail, because the fuel F flowing through the first passage P1 in the first manifold 120 is sprayed through the nozzle 121 and collides with the air A2 sprayed in a direction (e.g., the second direction) parallel to a direction in which the fuel F is sprayed through the fuel outlet 132, atomization may be accelerated for the first time. Next, because the atomized fuel AF sprayed through the fuel outlet 132 collides with the air A1 flowing in the first direction through the third passage P3, atomization may be accelerated for the second time.

Because a fuel injection apparatus for a gas turbine according to the above exemplary embodiments may enable fuel and air to collide with each other both in a parallel direction and an intersecting direction, atomization of the fuel may be accelerated.

It will be understood that the scope of the present disclosure is not limited by the effect.

While exemplary embodiments have been described with reference to the attached drawings, it will be understood by one of ordinary skill in the art that various changes in form and details may be made therein without departing from the spirit and scope of the inventive concept as defined by the following claims.

What is claimed is:

1. A fuel injection apparatus for a gas turbine, the fuel injection apparatus comprising:
   A housing
   a fuel supply pipe;
   a first manifold connected to the fuel supply pipe and comprising a nozzle through which fuel is sprayed;
   a second manifold at least partially surrounding the first manifold at a predetermined interval apart from the first manifold in a radial direction forming a first passage between the first manifold and the second manifold, the second manifold comprising:
      an air inlet through which a first portion of the air is introduced into the first passage; and
      an outlet where the fuel sprayed through the nozzle collides with the first portion of the air to form a mixed fuel;
   a first swirler provided at a predetermined interval apart from the second manifold in the radial direction, the first swirler configured to swirl the air, wherein the first portion of the air travels toward the air and inlet;
   a second passage between the second manifold and the housing through which a second portion of the air travels toward the outlet; and
   a second swirler provided in the first passage in the radial direction and configured to guide the first portion of the air introduced into the air inlet toward the outlet.

2. The fuel injection apparatus of claim 1, wherein the nozzle and the outlet overlap each other in the radial direction.

3. The fuel injection apparatus of claim 1, wherein a direction in which the fuel is sprayed through the nozzle and a direction in which the first portion of the air is sprayed through the outlet from the air inlet are parallel to each other.

4. The fuel injection apparatus of claim 1, wherein a direction in which the air is sprayed by the first swirler intersects a direction in which the mixed fuel is sprayed by the second manifold.

5. The fuel injection apparatus of claim 1, wherein the second portion of the air being swirled toward the outlet is configured to collide with the mixed fuel.

6. A fuel injection apparatus for a gas turbine, the fuel injection apparatus comprising:
   a housing;
   a first swirler provided in the housing and configured to introduce air into the housing;
   a fuel supply pipe configured to supply fuel and provided on the housing;
   a first manifold extending from the fuel supply pipe and comprising a nozzle through which the fuel is sprayed; and
   a second manifold provided in the housing, the second manifold comprising:
      an air inlet through which a first portion of the air is introduced into the second manifold through a first passage between the first manifold and the second manifold; and
      an outlet where the fuel sprayed through the nozzle collides with the first portion of the air to form a mixed fuel;
   a second swirler provided in the first passage in a radial direction and configured to guide the first portion of the air introduced into the air inlet toward the outlet,
   wherein at the air inlet, the air is branched into the first portion of the air and a second portion of the air,
   wherein the second portion of the air is configured to travel in a second passage provided between the housing and the second manifold, and
   wherein the second portion of the air is configured to collide with the mixed fuel.

7. The fuel injection apparatus of claim 6, wherein a direction in which the second portion of the air is sprayed by the first swirler intersects a direction in which the mixed fuel is sprayed by the outlet.

* * * * *